(12) United States Patent
Allum et al.

(10) Patent No.: US 8,869,396 B2
(45) Date of Patent: Oct. 28, 2014

(54) ROOTS-TYPE BLOWER ROTOR ALIGNMENT METHOD

(71) Applicant: CareFusion 202, Inc., San Diego, CA (US)

(72) Inventors: Todd W. Allum, Livermore, CA (US); Edgardo F. Marcelo, Irvine, CA (US); Stephen C. Hanson, Palm Desert, CA (US)

(73) Assignee: CareFusion 203, Inc., San Diego, CA (US)

( * ) Notice: Subject to any disclaimer, the term of this patent is extended or adjusted under 35 U.S.C. 154(b) by 0 days.

(21) Appl. No.: 13/924,308

(22) Filed: Jun. 21, 2013

(65) Prior Publication Data
US 2013/0283595 A1    Oct. 31, 2013

Related U.S. Application Data

(63) Continuation of application No. 12/263,769, filed on Nov. 3, 2008, now Pat. No. 8,479,379.

(51) Int. Cl.
| | |
|---|---|
| *B23P 15/00* | (2006.01) |
| *B23Q 17/00* | (2006.01) |
| *B23P 21/00* | (2006.01) |
| *B23P 19/10* | (2006.01) |
| *F04C 18/12* | (2006.01) |
| *F04C 29/00* | (2006.01) |

(52) U.S. Cl.
CPC ........... *B23P 19/10* (2013.01); *F04C 2230/603* (2013.01); *F04C 2240/81* (2013.01); *F04C 29/0035* (2013.01); *F04C 18/126* (2013.01)
USPC ......... 29/888.02; 29/468; 29/464; 29/407.05; 29/407.08; 29/714

(58) Field of Classification Search
CPC .. F04C 18/16; F04C 18/123; F04C 2230/603; F04C 2240/81; F04C 2/123; B23P 19/10; F02B 67/04
USPC ......... 29/882.02, 888.023, 888.024, 888.025, 29/468, 464, 700, 705, 709, 714, 29/407.01–407.09, 281.5; 418/1, 206.5, 418/206.1, 206.4, 189, 190; 702/138, 50; 73/487, 570; 123/559.1
See application file for complete search history.

(56) References Cited

U.S. PATENT DOCUMENTS

| | | | |
|---|---|---|---|
| 2,014,932 A | 9/1935 | Hallett | |
| 2,403,905 A * | 7/1946 | Brill | ............................. 290/1 R |

(Continued)

FOREIGN PATENT DOCUMENTS

| | | |
|---|---|---|
| JP | 09079165 | 3/1997 |
| JP | 10018982 | 1/1998 |

OTHER PUBLICATIONS

European Search Report; Application No. 09174837.6.

*Primary Examiner* — Sarang Afzali
(74) *Attorney, Agent, or Firm* — McDermott Will & Emery LLP

(57) ABSTRACT

A method of aligning the rotors of a Roots-type blower includes the steps of immobilizing an idler gear with reference to a housing of a Roots-type blower. A drive rotor is fixedly disposed on a drive shaft inside the housing with an idler rotor engaged with the drive rotor and fixedly disposed on an idler shaft. A drive gear is rotatably disposed on the drive shaft and the idler gear is engaged with the drive gear and fixedly disposed on the idler shaft. The drive shaft is rotated in opposite directions to first and second extents of travel. Each extent of travel is defined by contact of the drive rotor against the idler rotor. The drive shaft is positioned at a determined rotational angle between the first and second extents of travel and the drive gear is then fixed to the drive shaft.

8 Claims, 13 Drawing Sheets

(56) References Cited

U.S. PATENT DOCUMENTS

| | | |
|---|---|---|
| 4,536,126 A | 8/1985 | Reuther |
| 4,595,349 A * | 6/1986 | Preston et al. ............. 418/206.1 |
| 6,027,322 A | 2/2000 | Ferentinos et al. |
| 2007/0074692 A1 * | 4/2007 | Schafer et al. ............. 123/90.17 |
| 2011/0011079 A1 | 1/2011 | Kamen et al. |

* cited by examiner

ROOTS-TYPE BLOWER ROTOR ALIGNMENT METHOD

CROSS-REFERENCE TO RELATED APPLICATIONS

This application is a continuation of application Ser. No. 12/263,769, filed on Nov. 3, 2008, now U.S. Pat. No. 8,479,379, which is hereby incorporated herein in its entirety.

BACKGROUND

1. Field

The present invention relates generally to Roots-type blowers. More specifically, the invention relates to reduction of noise in Roots-type blowers through critical alignment of rotors.

2. Description of the Related Art

A characteristic Roots-type blower has two parallel, equal-sized, counter-rotating, lobed rotors in a housing. The housing interior typically has two parallel, overlapping, equal-sized cylindrical chambers in which the rotors spin. Each rotor has two or more lobes that interleave with corresponding lobes of the other. Each rotor is borne on a shaft carried on bearings, although both the shaft and the bearing arrangement may be integral at least in part to the rotor and/or the housing. In modem practice, rotor lobes of Roots-type blowers have screw, involute, or cycloidal profiles (those shown in the figures of this application are cycloidal), typically approximated as a series of arcs, and are driven by 1:1-ratio gears housed within a compartment separate from the rotor chamber. One of the rotor shafts is generally driven by an external power source, such as an electric motor, while the other is driven from the first. An inlet port and an outlet port are formed by removal of some portion of the material along the region of overlap between the cylindrical chamber bores. Net flow is transverse to the plane of the rotor shafts: the pumped material moves around the perimeter of the rotors from inlet to outlet, drawn into the blower as the interleaved lobes move from the center of the cavity toward the inlet port, opening a void; carried around the chamber in alternate "gulps" of volume between two lobes of a rotor in a cylinder, released to the outlet port by the lifting of the leading lobe of each successive gulp from the cylinder wall then forced out the outlet port as each lobe enters the next interlobe trough of the opposite rotor near the outlet port.

The number of lobes per rotor may be any; for example, two-, three-, and four-lobed rotors are known. So-called gear pumps are variations on Roots-type blowers that use involute lobe shape to allow the lobes to function as gears with rolling interfacial contact; such designs also allow an option of differential numbers of teeth.

Before the early 1900s, lobes of Roots-type blowers were straight (lines defining the surfaces were parallel to the respective axes of rotation) rather than helical. Blowers with such lobes produce significant fluctuations in output during each rotation, as the incremental displaced volume is non-constant. Leakback (flow from the outlet side back to the inlet side due to differential pressure $\Delta p$) between properly-shaped straight lobes can be substantially constant, however, to the extent that all gaps can be made uniform and invariant. Developments in manufacturing technology by the 1930s included the ability, at reasonable cost, to make gear teeth and compressor lobes that advance along the axes of rotation following a helical path. This lead to Roots-type blowers with effectively constant displaced volume rather than discrete pulses, such as those disclosed by Hallet, U.S. Pat. No. 2,014,932. Such blowers have displayed pulsating leakback, however, so that the net delivered flow remains non-constant.

SUMMARY

Some embodiments of the present invention reduce pulse energy and associated noise in a Roots-type blower by rendering pulsations in leakback appreciably more uniform with respect to lobe identity than in previous helical-rotor designs. The principal mechanism for this uniformity is an improvement in alignment between rotors facilitated by precise measurement and adjustment of relative angular position during rotation.

A Roots-type blower rotor alignment method according to one aspect includes installing a paired drive rotor and idler rotor in a blower housing, attaching an idler gear to a gear-side idler rotor shaft, immobilizing the idler gear with reference to the housing, and attaching an extended lever arm to a motor-side drive rotor shaft.

The method further includes rotating the extended lever arm in alternate directions to displace the lever arm to a first and a second extent of travel, wherein each extent of travel is defined by contact of the drive rotor against the idler rotor within the housing, measuring the displacement of the lever arm between the two extents of travel, forming a first position value by adding a first reference compensation value to a displacement value midway between the measured displacement extents, and attaching a drive gear to a gear-side drive rotor shaft.

The method further includes establishing a rate of flow of gas into an outlet port of the blower, rotating the drive shaft in a forward-flow direction at a predetermined rate, measuring flow pressure at a location in the flow path, comparing pulse transient magnitude and rate in the measured flow pressure to a first pass/fail criterion for magnitude and a second pass/fail criterion for rate, and assigning a passing rating to a blower satisfying both criteria.

In another aspect, a Roots-type blower alignment apparatus is presented. The apparatus includes an angle-setting tool base, a blower clamp, articulately mounted to the setting base, wherein the clamp is configured to releasably engage a blower to the setting base, an idler gear engagement assembly, wherein the idler gear engagement assembly is configured to rotate over a range sufficient to permit establishing a mesh between a blower idler gear and a component of the idler gear engagement assembly having an eccentric-borne idler gear engagement tooth pattern configured for meshing therewith, and wherein the idler gear engagement tooth pattern is rotationally fixed with respect to the assembly, and an idler gear engagement assembly rotation lock, wherein the rotation lock is configured to clamp rotation of the idler gear engagement assembly at least at an angle wherein the idler gear engagement tooth pattern is meshed with the idler gear.

The apparatus further includes an angle sensing lever for a motor-side drive shaft of a blower, configured for clamping to the drive shaft, extending substantially perpendicular to an axis of rotation of the drive shaft when clamped to the drive shaft, an angle sensing lever displacement gauge, configured to detect and to provide indication of displacement of the angle sensing lever over a range of displacement of the lever, and a lock for the angle sensing lever, configured to clamp the lever at a position within the range of detection of the displacement gauge.

The apparatus further includes a motorized blower shaft drive, a coupling between the blower shaft drive and the blower, a source of test gas at a first pressure, coupled to the blower outlet port, a destination for test gas at a second pressure, lower than the first pressure, coupled to the blower inlet port, and a gas pressure transducer that provides an output in electrical form proportional to an input in gas pressure form, wherein the gas pressure input to the transducer is connected thereto from a point that manifests gas pressure proportional to blower leakback in a flow path from the test gas source through the blower to the test gas destination. The apparatus further includes a data acquisition system configured to convert pressure transducer output to a presentation of pressure as a function of time, and a criterion for passing or failing a blower subjected to test gas flow at a predetermined rate and rotating at a predetermined speed.

In still another aspect, a Roots-type blower alignment apparatus is presented. The apparatus includes tools for assembling a blower to the point where the rotors are carried by bearings as necessary and fitted within the rotor housing, with the chamber closed at both ends, with drive rotor and idler rotor gears meshed and fitted to their respective shafts, and with the idler gear tightened into place.

The apparatus further includes a clamp that can hold the idler gear stationary with respect to the housing and an angle sensor that can measure the difference between the angular position of the drive rotor at its two limits of rotation, with the limits established by contact between the immobilized idler rotor and the movable drive rotor at each end of travel and quantified by the angle sensor. The apparatus further includes a drive rotor clamp compatible with the angle sensor, and a tool for tightening the drive gear to the drive rotor.

The apparatus further includes a gas source configured to attach to the blower outlet port, so that there is an inlet-outlet pressure differential, a motor and coupler to rotate the drive rotor shaft in its normal direction for transporting gas from inlet to outlet, a pressure transducer positioned to sense pressure variation at a location within a gas flow path from the outlet port to the inlet port, a display device configured to present the pressure transducer output as a function of shaft angle and/or time, and a rule allowing the display to be compared to at least one standard for proper operation, whereby accuracy of alignment of a blower under test may be evaluated.

There have thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments, and of being practiced and carried out in various ways. It is also to be understood that the phraseology and terminology employed herein, as well as in the abstract, are for the purpose of description, and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
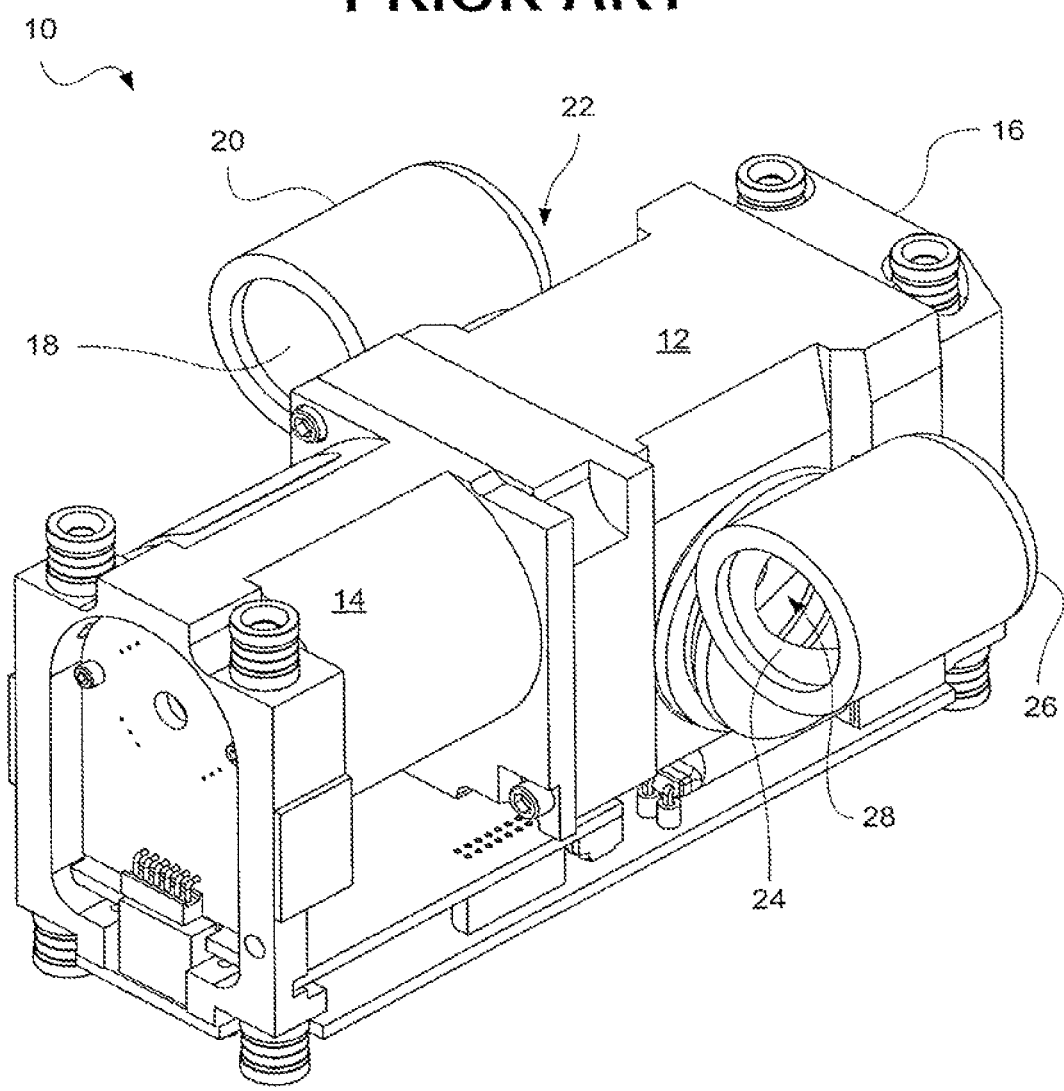
FIG. 1 is a perspective view of a complete Roots-type blower.

The invention will now be described with reference to the drawing figures, in which like reference numerals refer to like parts throughout. An embodiment in accordance with the present invention provides an improved Roots-type blower alignment method, as well as apparatus in support thereof, wherein Roots-type blowers may be adjusted in a mass-production environment to produce reduced levels of rotor rotational alignment-related noise artifacts when compared to previous mass-production methods and apparatus. Quantification, verification, and repeatability made possible by the present invention overcome producibility limitations intrinsic to the prior art.

Rotors made reference to in the discussion that follows, whether helical or straight-cut, are cycloidal rather than involute in section. This omits a tendency to transiently trap, compress, and then release gas volumes, and thus eliminates an additional well-understood noise source, not a part of the present invention.

Two distinct phenomena characterize helical rotors as compared to straight rotors used as blowers for air as in the invention disclosed herein, namely output rate and leakback rate. Helical rotors can be configured to provide substantially constant output rate over a cycle of rotation, particularly when compared to the pulsating output rate characteristic of straight rotors. However, leakback may be rendered more variable in the otherwise-desirable helical rotors than in straight rotors by a particular dimension of helical rotors.

FIG. 1 is a perspective view of an example of a Roots-type blower 10, wherein a housing 12 is bounded on a first end by a motor cover 14, and on a second end by a gear cover 16. An inlet 18 is established by the housing 12 shape and by an inlet port cover 20, with the latter concealing the inlet port 22 in this view. An outlet 24 is likewise established by the housing 12 shape and by an outlet port cover 26, concealing the outlet port 28.

Figure 2:
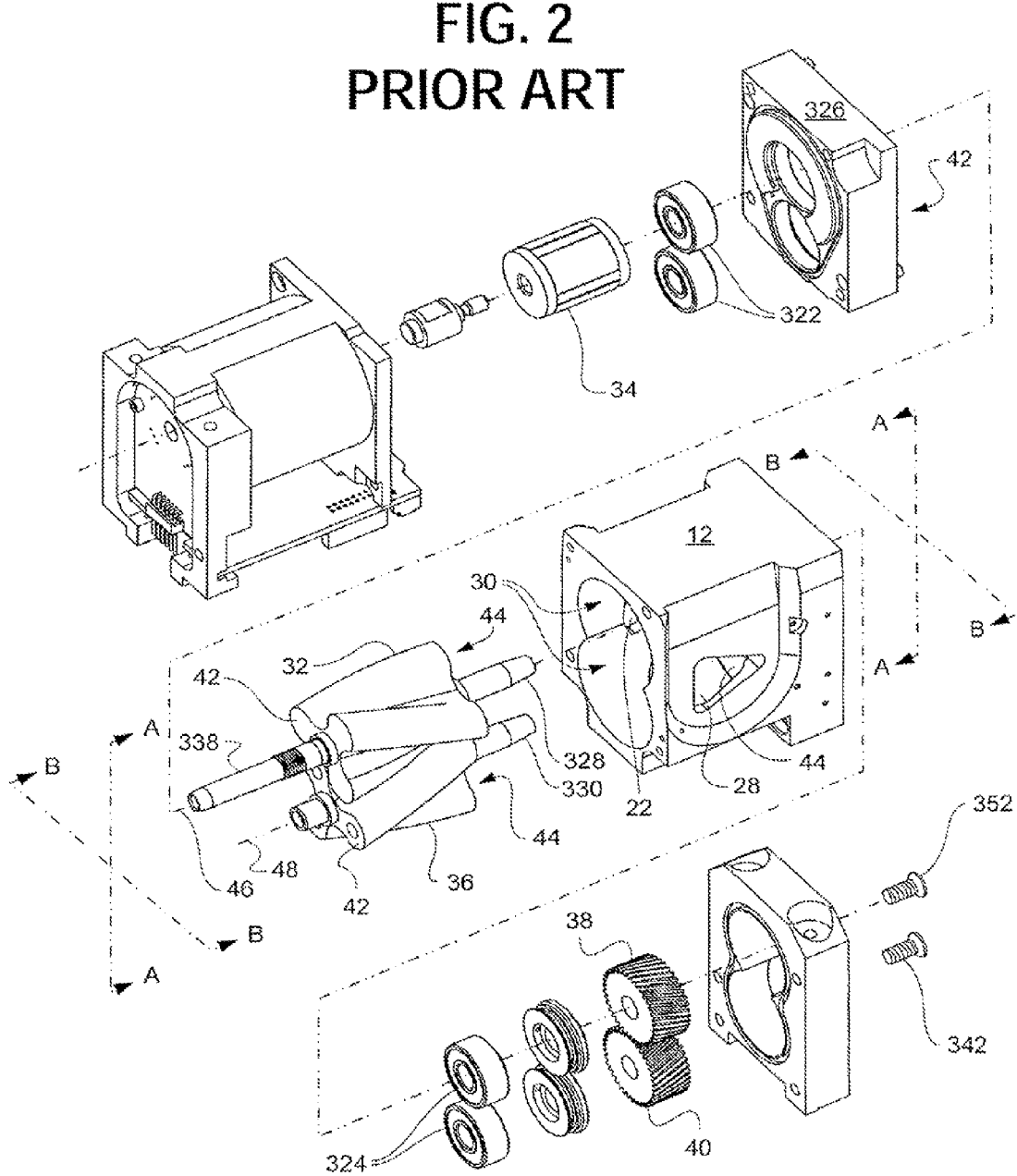
FIG. 2 is a perspective view showing the blower of FIG. 1 in exploded form.

FIG. 2 is an exploded perspective view of the blower of FIG. 1, less the inlet and outlet port covers. The housing 12 includes a twinned chamber 30. In this view, the driving rotor 32 (connected to the motor 34) and the driven (idler) rotor 36 may be seen to form mirror-image helices, configured to counter-rotate with a constant gap between proximal surfaces along a continuous line, as addressed in detail below. Driving and driven (idler) gears 38 and 40, respectively, are adjustably coupled to the respective rotors 32 and 36. The inlet port 22 and outlet port 28 may be seen in this view. Section plane A-A-A-A includes the rotor axes 46, 48, coinciding with the bore axes of the twinned chamber 30. Details of bearings for rotating parts, whether plain, sleeve, ball, needle, air, combination, or the like, as well as of fastenings and retainers, may be realized as required for thrust, radial loading, and positional stability of an embodiment.

The discussion below addresses the rotor-to-chamber interface and the interface between respective rotors in view of leakback. Aspects of blower design that may attenuate leakback-induced noise are not addressed herein.

The interface between the helical rotors 32, 36 and the chamber 30 in which they operate has substantially flat first (motor)-end 42 and second (gear)-end 44 boundaries of largely constant leakback flow resistance, and, prior to the present invention, perimeter wall boundaries that were likewise largely constant in leakback flow resistance. The interface between two properly formed and spaced and substantially mirror-image helical rotors 32, 36 has a boundary over the length of the rotors that varies periodically with angular position. There is a particular angle exhibiting minimum leakback that recurs at six positions (assuming the two three-lobe rotors of the figures) during each rotation.

Figure 3:
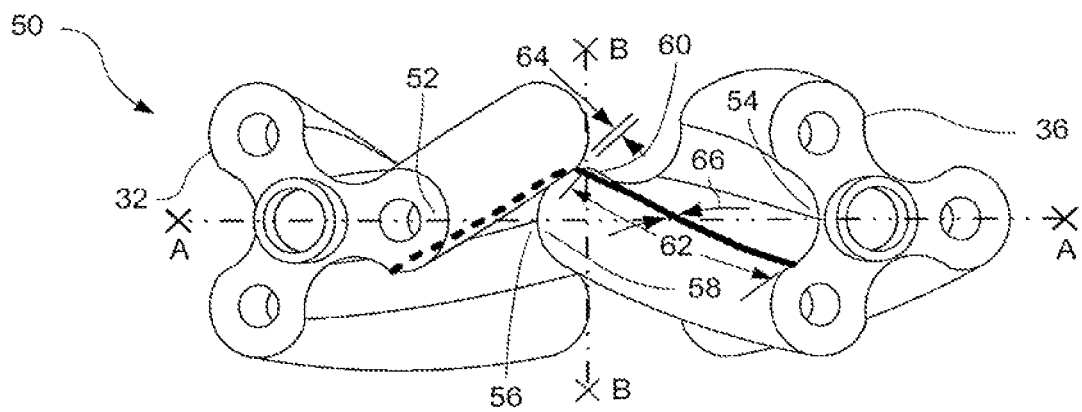
FIGS. 3, 4, and 5 are perspective views that show pairs of rotors, rotated out of alignment for clarity, in zero-degree, thirty-degree-, and sixty-degree-angle positions, respectively, and including a line on each rotor representing a locus of flow gap between the rotors for each position.

FIG. 3 is a perspective view 50 showing respective rotors 32, 36 tilted away from one another, oriented in a first one of these minimum-leakback angular positions, referred to herein as the zero-angle position. In this position, a first lobe 52 of the first helical rotor 32 is fully engaged with a first interlobe trough 54 of the second helical rotor 36, and first lobe 52 and trough 54 arealigned with plane A-A of the rotor axes 46, 48 (shown in FIG. 2), at the proximal end (closest to the viewer; this may be the gear end, although the shaft is omitted) of the rotors 32, 36. At this zero angle, a second lobe 58, part of the second rotor 36, is fully engaged with a second trough 56, part of the first rotor 32, at the distal end (the motor end if the proximal end is the gear end) of the rotors 32, 36, also in plane A-A. Continuously along the rotor interface, a sinuous gap path 60 having substantially uniform thickness exists. The leakback through this sinuous gap path 60 (when the rotors are parallel as shown in FIG. 2) is likewise substantially uniform, and, as mentioned, at a minimum. The path 60 is shown as a heavy bold line on both rotors 32, 36, dashed where view is blocked by the interposed lobes.

It may be observed that the gap 60 between the rotors 32, 36 at the proximal end, middle, and distal end effectively follows a continuous line 9 that lies approximately in both the plane A-A of the rotor axes and in an interface plane B-B, likewise indicated in FIG. 2, which is a plane perpendicular to the rotor axis plane A-A, and equidistant between the rotor axes 46, 48. As a consequence, there is no predominant direction for leakback flow other than roughly from a centroid of the outlet port 28 to a centroid of the inlet port 22, and thus perpendicular to the plane A-A of the rotor axes and lying in the interface plane B-B. This extent of flow and flow direction are termed natural leakback (NLB) herein. NLB may be quantified as the product of gap width 62 (approximately the rotor length) and gap thickness 64 (inter-rotor spacing, not readily shown with the rotors tilted apart as in this view).

It is to be understood that gap length 66, that is, the travel distance for molecules passing from high to low pressure, is a relatively insignificant factor in flow resistance for mechanical devices, and thus between the rotors 32, 36. Gap cross-sectional area is of greater importance in flow resistance, and thus in leakback in the case of Roots-type blowers.

Figure 4:
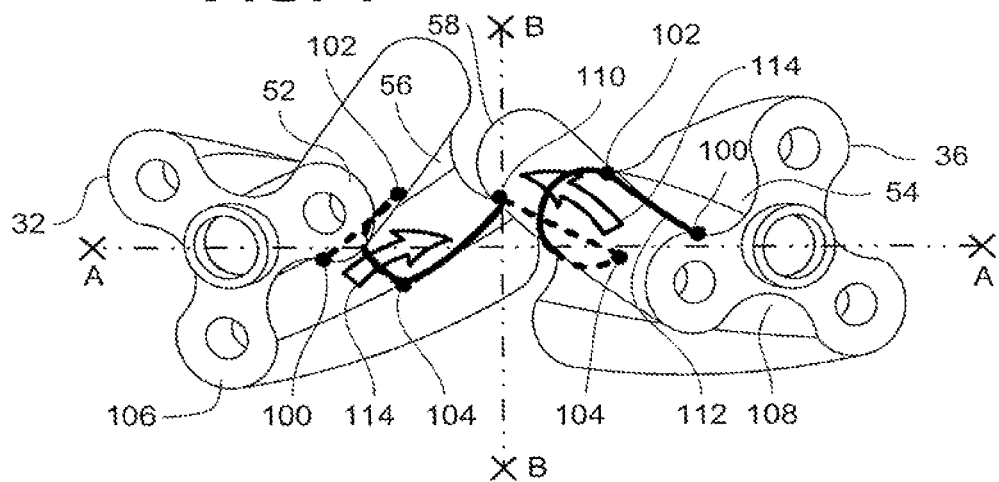

FIG. 4 shows the rotors 32, 36 of FIG. 3, tilted apart for illustrative purposes as before, advanced thirty degrees in rotation. The proximal end of the first lobe 52, previously centered, has advanced, although a transition point 100 on the first lobe 52 is still fully in proximity to a corresponding point 100 on the second rotor 36. At the middle of the rotors 32, 36, corresponding transition points 102, between the first trough 54 and the second lobe 58 and between the first lobe 52 and the second trough 56, are now becoming disengaged, while a second engagement is forming at corresponding transition points 104, between the second trough 56 and the third lobe 106 and between the second lobe 58 and the third trough 108. At the distal end, the second lobe 58 transition to the third trough 108 is at the end of its engagement at corresponding points 110 (overlapping) with the transition between the second trough 56 and the third lobe 106.

In this angular position, a gap path 112 between the rotors 32, 36 has a maximum extent—the gap has an extended shift from 102 to 104, adding about 40% to the width in some embodiments, while the gap thickness remains substantially uniform. Since pressure between the outlet and inlet ports may be constant, this greater width results in lower flow resistance. This lower flow resistance is associated with maximum leakback. It is to be observed that, while the path 112 at the thirty degree rotational position remains roughly in the interface plane B-B, it is distended out of the plane A-A of the rotor axes 46, 48 as shown in FIG. 2, in greater part than the gap path 60 shown in FIG. 3. As a consequence, the direction of leakback flow has at least a component 114 that is axial, that is, perpendicular to the outlet-to-inlet port direction, in a proximal-to-distal direction.

Figure 5:
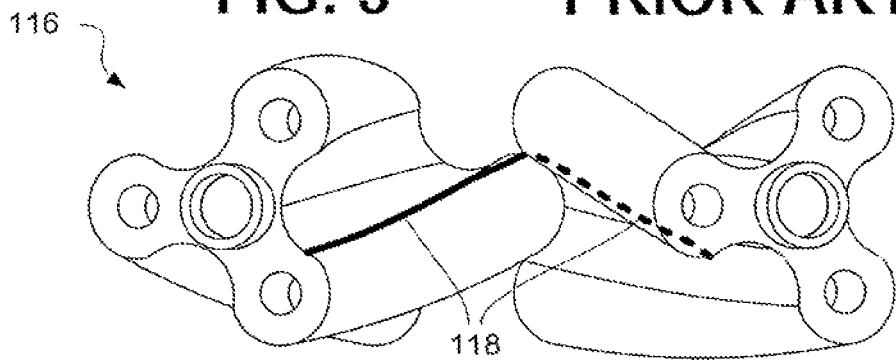

As the rotors continue to advance, the sixty degree position 116, shown in FIG. 5, mirrors the zero degree position of FIG. 3, with leakback through a sinuous gap path 118 again at a minimum. The ninety degree position, not shown, mirrors the thirty degree position of FIG. 4. In the ninety degree position, the angle between the sinuous gap path and the rotor axis plane is reversed, so that the axial component of flow is reversed from that of the thirty degree position, to a distal-to-proximal direction.

The existence of an absolute gap between the rotors, and of gaps between each rotor and the cylindrical wall of the chamber, is preferred under all operational conditions in order for power consumption, noise, and wear to be kept low. To assure this, materials for the rotors and chamber, at least, may either be the same or display comparable temperature coefficients of expansion (CT), so that gaps between parts are substantially invariant over temperature. For example, in an embodiment for which a particular aluminum alloy is preferred for a blower 10, as shown in FIG. 1, it may be preferable that all parts of the enclosure, including housing 12, end plates 14, 16, and the like, be fabricated from this alloy and subjected to the same heat treatment if such treatment affects CT. In addition, the rotors, shafts, gears, and associated parts may be fabricated either from the same alloy or from another material having a substantially equal—and isotropic-CT. Polyether ether ketone (PEEK), to cite one of several engineering plastics that may be suited to rotor applications, may be filled with materials that jointly realize a product with a CT that closely conforms to that of certain aluminum alloys, and may thus be suited to inclusion in a low-noise blower. For embodiments involving extreme temperatures, caustic fluids, abrasive suspensions, and the like, further refinement of material selection, which may include using the same material, heat treatment, coatings and surface treatments, and stress removal processes for all elements in contact with the transported fluid, may be preferred.

The blower apparatus described in the foregoing disclosure may be assembled and validated using prior-art method and apparatus, or with a novel method and apparatus that significantly enhance at least the rapidity with which sample-to-sample consistency and performance of the as-built product may be achieved. The prior-art assembly method provides only a general extent of clearance between rotor lobes 32, 36 as shown in FIG. 2. However, it has been shown that relative uniformity of leakback over the complete rotation cycle appreciably reduces noise.

Figure 6:
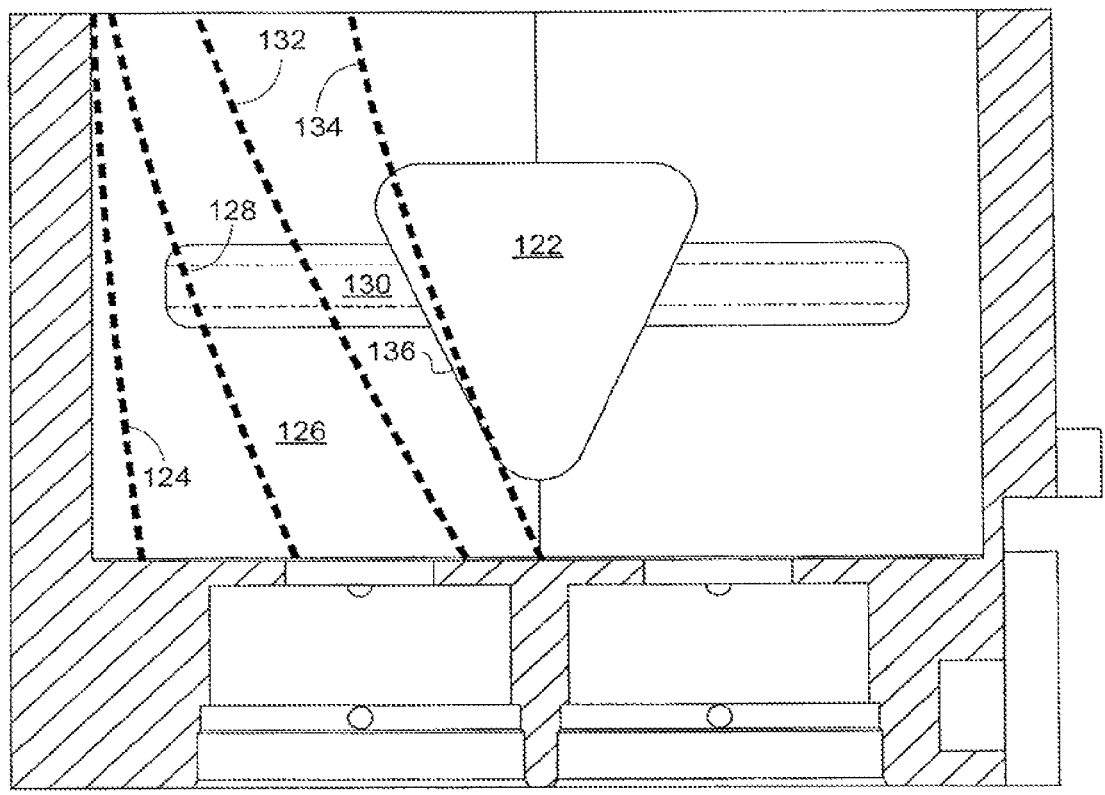
FIG. 6 is a first section view, looking out the outlet port, of the housing component of a blower usable with the present invention.

FIG. 6 is a section view 120, looking toward the outlet port 122, of a blower chamber. Dashed lines represent a lobe tip at representative positions. A first dashed line 124 represents a lobe tip still end-to-end proximal to—and providing a baseline extent of leakback with respect to—the chamber wall 126. In this position, the lobe tip serves as the leading edge of a gulp that holds an air volume not yet directly in contact with fully pressurized air at the outlet port 122.

A second line 128 represents the same lobe tip, advanced sufficiently to begin opening a relief groove 130, let into the chamber with gradually increasing depth of penetration of the chamber wall, and ultimately cutting into the outlet port 122 sidewall (the perimeter surface perpendicular to the rotor axis plane A-A shown in FIG. 2), whereby air pressure present at the outlet port 122 begins to be introduced into the gulp. When the lobe tip has advanced to the position of a third line 134, the gulp is fully open to the outlet port 122. The opening of the outlet port 122 to the gulp is mediated by the relief groove 130. The effect of rotor motion defines the pressure pattern of FIG. 8, discussed below. This applies to substantially any configuration of relief grooves, whereof those shown in FIG. 6 are representative.

Figure 7:
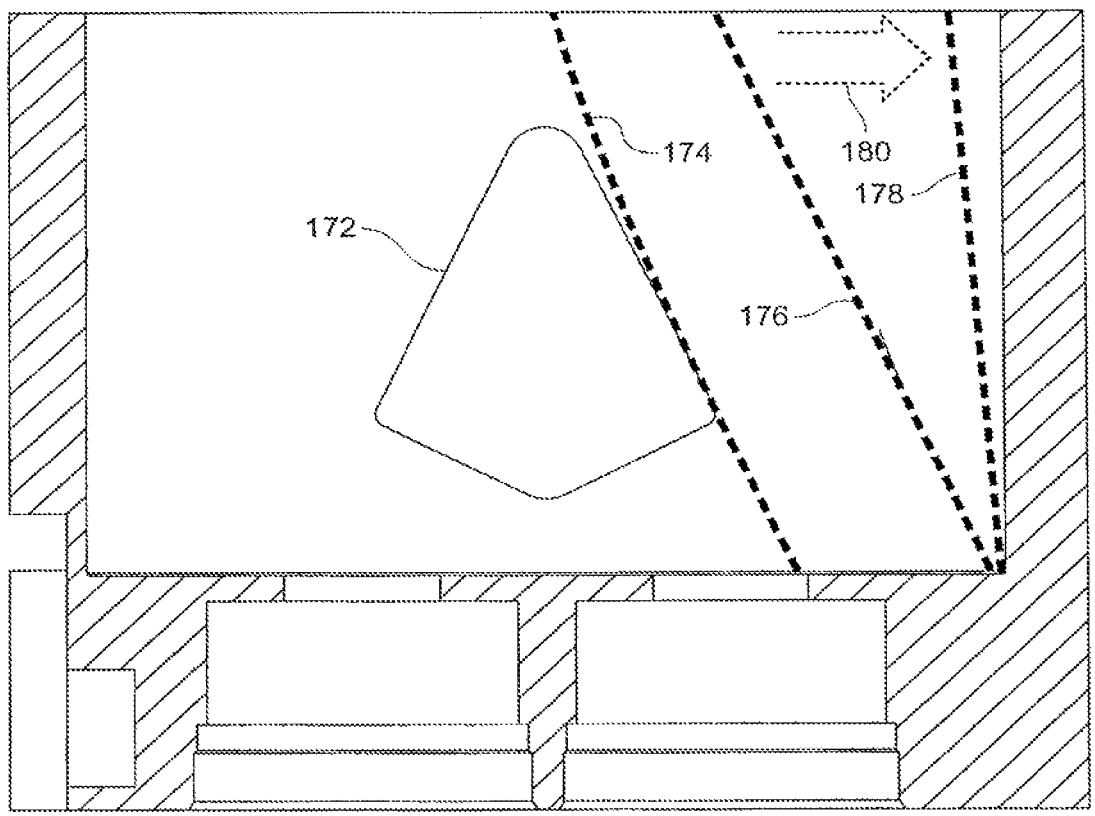
FIG. 7 is a second section view, looking out the inlet port, of the housing of FIG. 6.

FIG. 7 is a section view 170 of a chamber, looking instead toward the inlet port 172. Dashed lines 174, 176, and 178 represent lobe tip positions during regular motion 180. Lobe tip positions 174, 176, and 178 correspond approximately to positions 124, 128, and 134 of FIG. 6, wherein leakback between rotors 32, 36 varies with angular position.

The phenomena repeat at six rotation angles, alternating between the rotors, for a blower having two three-lobed helical rotors. Leakback flow may be seen to be largely directed from outlet to inlet, and thus non-axial, at minimum flow, and to have a significant axial component 114, shown in FIG. 4, at maximum extents of leakback flow.

Figure 8:
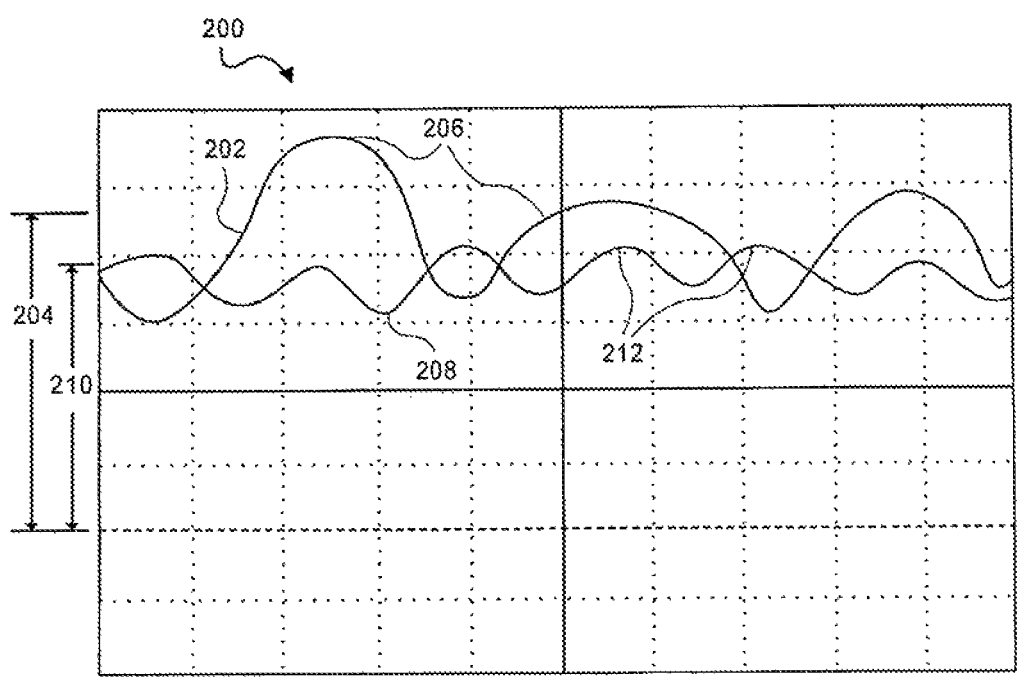
FIG. 8 is a plot of leakback variation over one revolution that contrasts incorrect and correct alignment according to the present invention.

FIG. 8 is a plot 200 of port pressure as a function of time, corresponding to leakback flow as a function of rotor angular position over a shaft rotation. The plot 200 shows that the above-described misalignment, resulting in gap width imbalance, and thus imbalance in leakback, produces a measurable noise artifact directly associated with rotation speed and outlet pressure. Misalignment manifests as shown in a first graph 202 of port pressure. Port pressure 204 is non-constant over angular position, and exhibits a noticeable peak 206 three times per shaft revolution.

FIG. 8 further shows a second graph of port pressure 208 as a function of angular position, realized by aligning a blower in accordance with the inventive improvement. In the properly aligned blower, the nominal port pressure waveform 210 is broadly comparable to that 204 of the misaligned blower, but the rate of occurrence of pressure peaks 212 associated with the minimum leakback angular positions of FIGS. 3 and 5 is doubled to six per revolution, and the magnitude of the peaks 212 is appreciably less. The source of this improvement in performance is the repeatability of alignment made possible by the novel method and apparatus.

Representations of blower performance such as the graphs 202, 208 may be generated using analog pressure detection, that is, one or more pressure transducers with outputs that are voltages that vary continuously with the input pressure. Any of a variety of digitized transducers may also be suitable; such devices typically sample the input pressure at discrete time intervals. Analog transducers may also be sampled, with the samples processed for storage or display. With sampling-based testing, it is useful that the sample rate be at least the Nyquist rate, that is, twice the rate of the highest frequency of interest. For example, a rate of at least twelve times the blower shaft rotation rate is preferred to overcome aliasing—that is, masking of the actual pulse rate by a sub-harmonic. A sample rate significantly higher than this—two, four, or more times higher—can further show that harmonic components of these nonsinusoidal waveforms contain significant energy.

Figure 9:
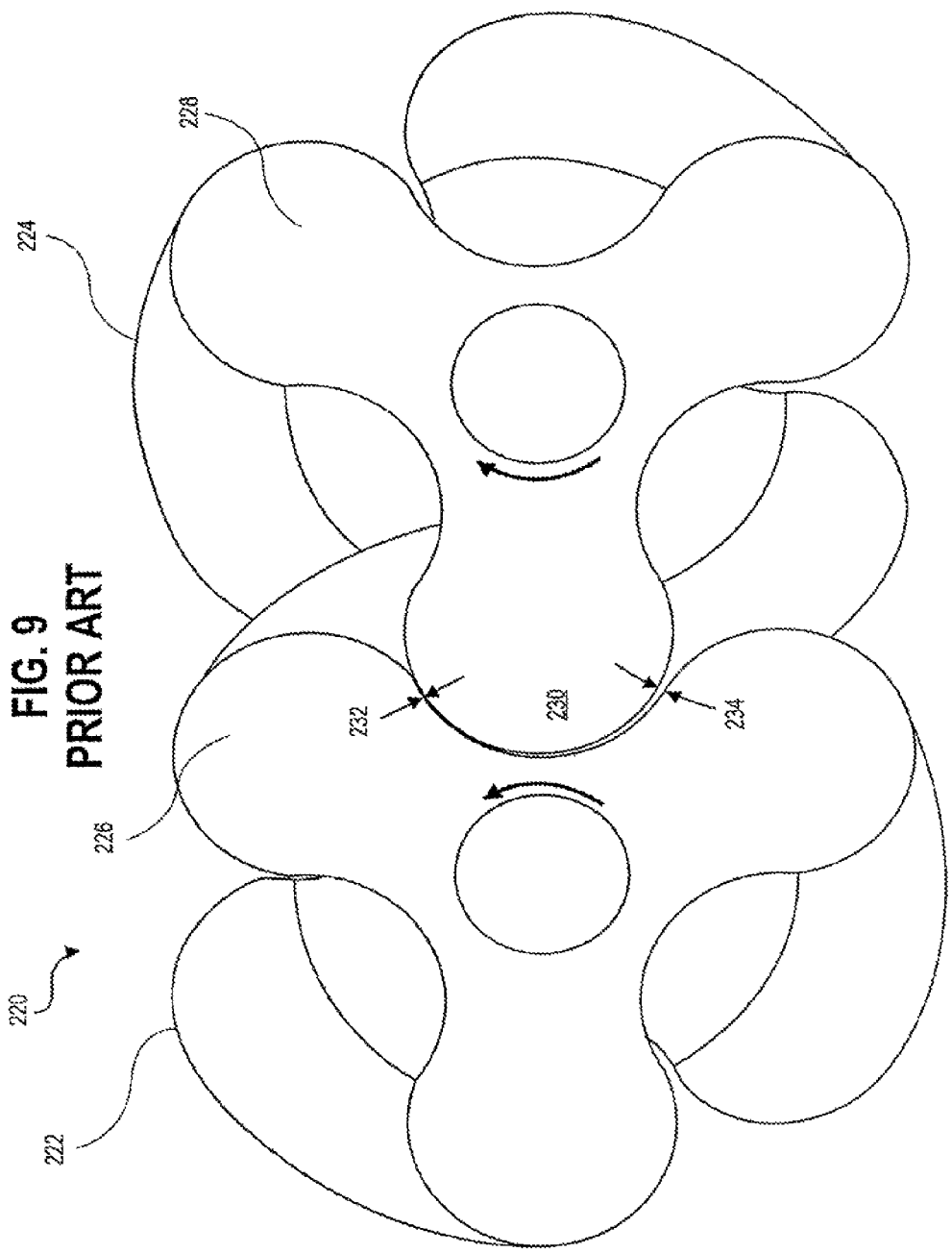
FIGS. 9 and 10 are end views corresponding to the views of FIGS. 3 and 4, without tilting the axes apart, illustrating a misaligned rotor pair.

FIG. 9 is a shaft-end view 220 that shows a rotor pair 222, 224 with an alignment error. The foreground faces 226, 228 of the respective rotors are shown in full mesh; a parallel section through the rotors 222, 224 at any distance would show a similar relationship between leading and following gaps. As may be seen, the engaged lobe 230 is advanced ahead of a properly aligned position so that a leading-side gap 232 is less than a trailing-side gap 234.

Figure 10:
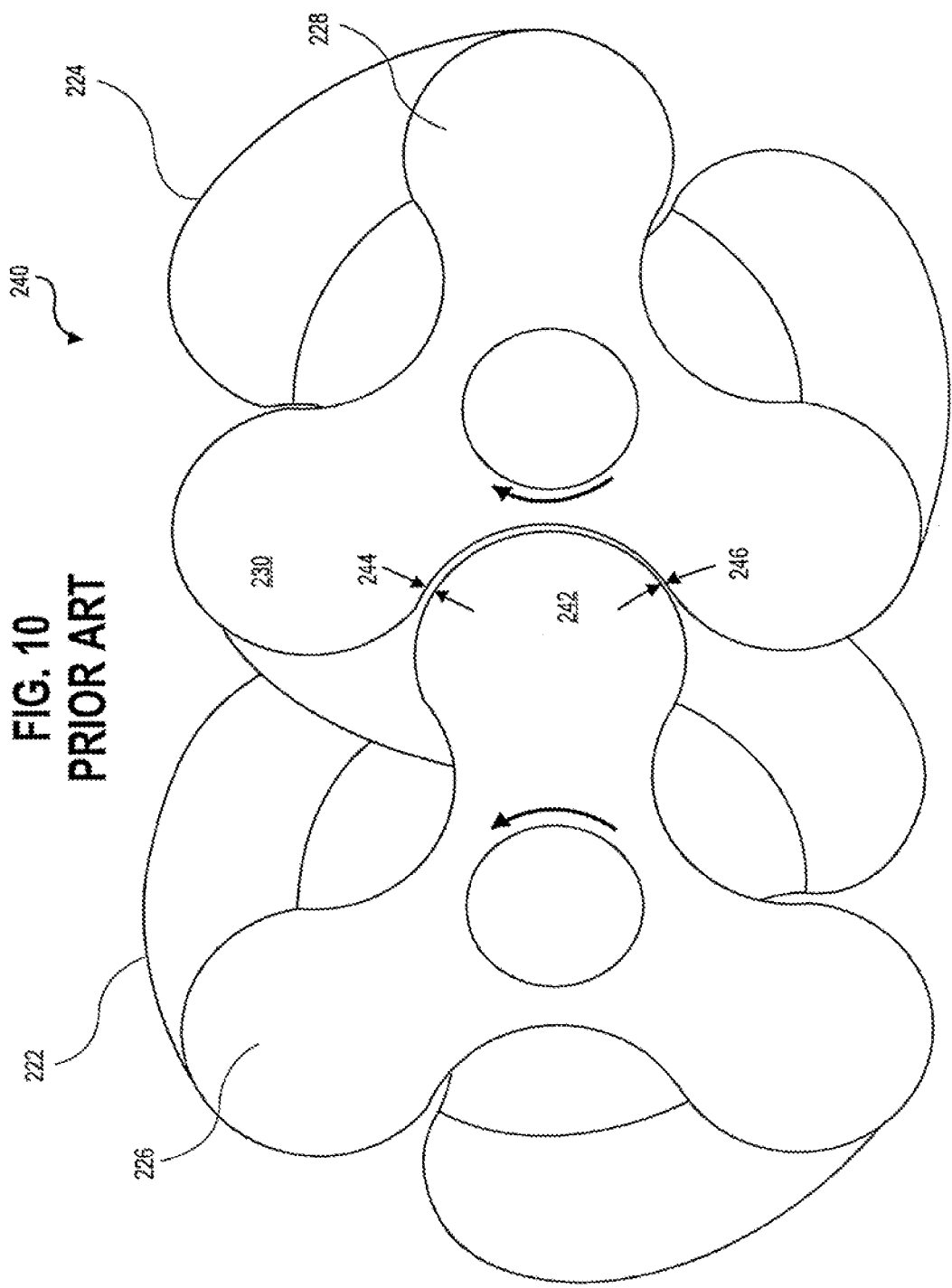

FIG. 10 is a corresponding view 240 to FIG. 9, representing the same rotor pair 222, 224 after a sixth of a rotation. The previously-noted engaged lobe 230 is advanced by sixty degrees, so that a lobe 242 from the opposite rotor is now in full mesh. Because of the alignment error, the leading-edge gap 244 exceeds the trailing-edge gap 246. By comparing the views, it may be understood that the leakback rates at these extremes of angular position differ. The alternation between the two extents of leakback fluctuation repeats three times during each full rotation. Were alignment correct, there would instead be six substantially identical leakback fluctuations, so that the excursion range in pressure variation would be less at the same time that spectral content of noise generated by the variations would embody a higher-pitched fundamental, as distinguished in the two waveforms 202, 208 in FIG. 8.

Because acoustic filtering is simpler at higher frequencies, further quieting of the signal is eased not only by its reduced amplitude roughly half—but also by its octave—higher (double-frequency) pitch. For example, smaller baffles, thinner damping materials, and the like may suffice to attenuate higher frequency energy, while fewer harmonics are available to excite resonances. Thus, doubling the frequency of a noise signal source tends to improve quieting.

Prior-art alignment methods and apparatus lack fine control over inter-rotor placement. As a consequence, they leave sufficient uncertainty in angular position between the rotors 32, 36 that alternating tight and loose leakback gaps, as shown in FIGS. 9 and 10, may occur. As a consequence, leakback may be excessive when a lobe from one rotor is engaged in the interlobe trough of the other rotor, and deficient when a lobe from the other rotor is in that position, with the characteristic three-around pulsation 206 of FIG. 8 resulting. This may vary greatly from assembly to assembly as aligned by prior-art methods. Blowers aligned by prior-art methods may have unpredictable noise levels, including a pronounced level of lower-octave output in some but not others. Rework of noisy or quiet blowers using the prior-art methods, including rework after passing a noise test a previous time, likewise yields unpredictable results. Further, while one artisan may produce quieter units than another artisan, the more successful artisan may lack genuine control over the process.

A noise source as described herein may be identified through modeling and experimentation; the present invention defines a preferred apparatus and a method of alignment to allow a craftsman rather than an artisan to produce quiet units, to do so predictably, to impose substantial quieting on virtually any noisy unit, and to rework a unit repeatedly if desired with assurance that its noise level will not vary appreciably from a preferred low level.

The method and apparatus of the present invention establish significantly increased uniformity in interlobe gaps 64 between drive rotor lobes and idler rotor lobes. The apparatus provides a long lever arm, suitable for measuring interlobe gap with increased resolution, while the method permits quantification and compensation for tolerance buildup in each unit. Implicit in the method is the axiom that manufacturing tolerances on individual components, such as bearing race position, rotor profile, and the like, can be made tight but cannot be zero. Thus, residual error in an assembly, while small, may accumulate. An inadequate method may produce a virtually ideal result for one sample, yet yield a deficient result for another. At least some reliable methods may include iterative processes for error correction.

Figure 11:
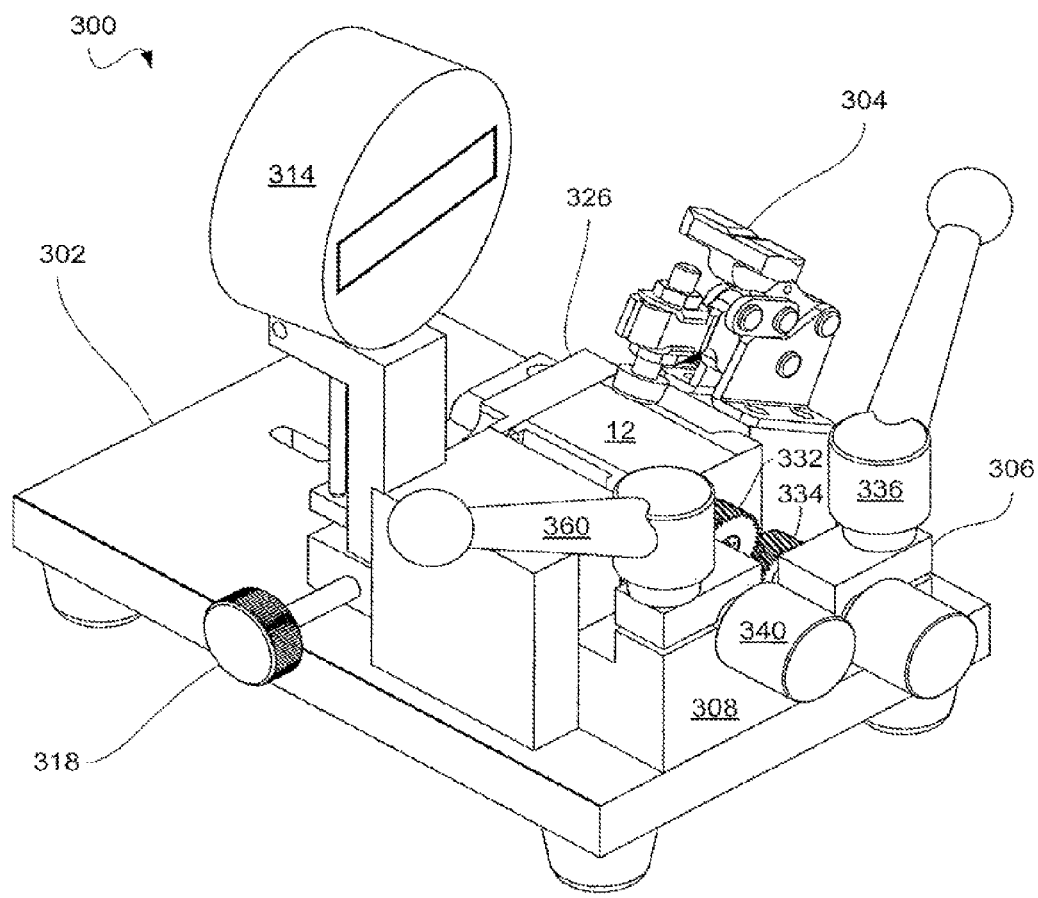
FIG. 11 is a first perspective view of a blower mechanical alignment fixture incorporating the present invention.

FIG. 11 shows calibration tooling 300 in a first perspective view. The tooling 300 includes a base 302, a housing clamp 304, an idler gear-control group 306, and a drive gear-control group 308.

Figure 12:
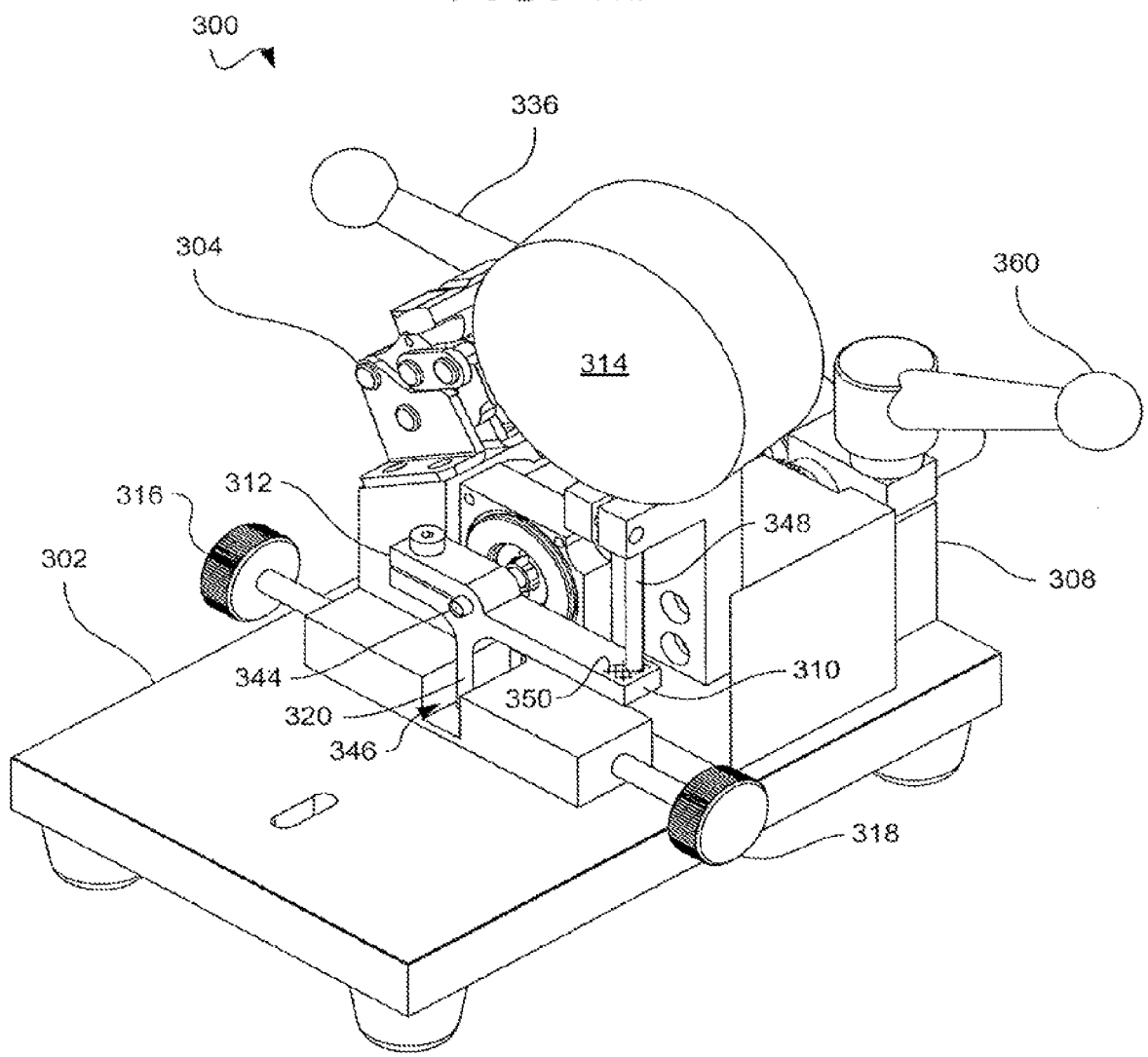
FIG. 12 is a second perspective view of the mechanical alignment fixture incorporating the present invention.

FIG. 12 shows the tooling 300 of FIG. 11 in a second perspective view. FIG. 12 shows a motor-shaft lever arm 310 with shaft clamp 312, a deflection gauge 314, a first lever arm deflection screw 316, a second lever arm deflection screw 318, and a lever arm deflection screw contact tab 320.

Figure 13:
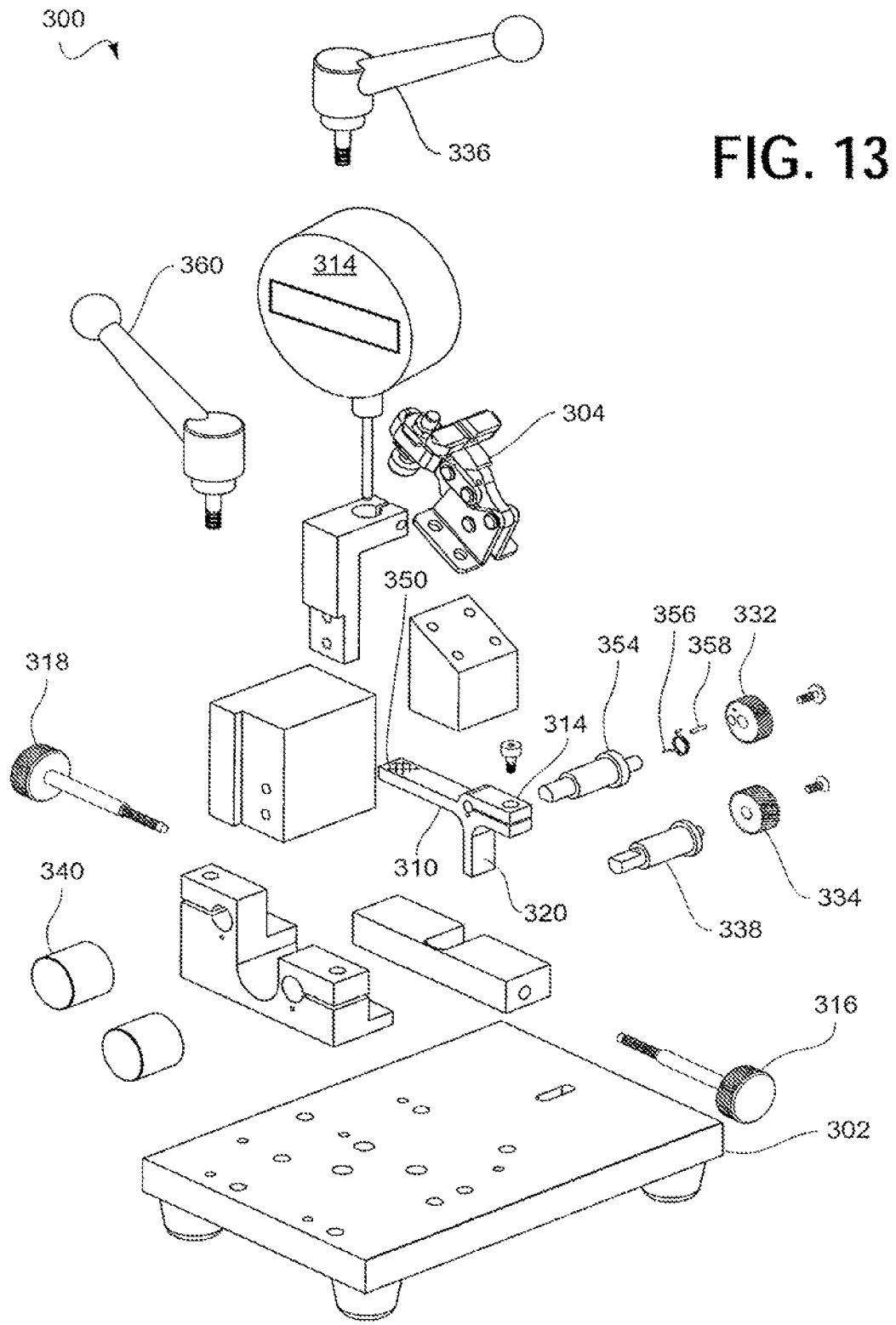
FIG. 13 is an exploded view of the mechanical alignment fixture incorporating the present invention.

FIG. 13 shows the tooling 300 of FIGS. 11 and 12 in an exploded view. The discussion below refers to all three figures, as well as to FIG. 2, as needed for clarity.

In operation, a user can secure a blower housing 12—previously assembled with rotors 32, 36 and bearings 322, 324, and a motor-side cover 326, fully enclosing and supporting the rotors, and with the first (drive) rotor gear 38 and the second (idler) rotor gear 40 fitted onto their respective shaft tapers 328, 330 (shown in FIG. 2), with the gears 38, 40 not tightened—to the tooling 300. Securing the housing 12 may be performed by placing the housing 12 flat onto the base 302 and further moving the housing 12 against prepared reference surfaces of the fixture, engaging eccentric-mounted, non-rotating idler clamp gear 334 with idler gear 40, and actuating the housing clamp 304 to lock the housing 12 and idler locking lever 336 to lock the eccentric shaft 338 of the idler clamp gear 334.

The idler rotation locking lever 336 includes a locking screw part that advances and withdraws helically when rotated in alternate directions, thereby reducing and increasing a pass diameter of a bearing hole through which the shaft 338 passes by closing and opening a relief in the bearing hole, binding and releasing the eccentric shaft 338. The idler gear 40 is engaged and immobilized by the idler clamp gear 334.

The drive gear 38 may then be engaged with the drive clamp gear 332 by rotating the eccentric shaft of the drive clamp gear 332 using drive knob 340, but the drive clamp gear 332 is free to rotate within limits. The user may tighten a screw 342 with a predetermined torque to fix the idler gear 40 to its shaft taper 330 either before or after installing the blower housing 12 on the tooling 300.

With the drive gear 38 clamped, but loose enough on its shaft to allow the drive rotor 32 to rotate, and with the lever arm 310 attached to the motor end of the drive rotor shaft 344 by a locking clamp 312 with lever arm deflection screw contact tab 320 roughly centered within its slot 346, the user may rotate the motor shaft 344 manually by raising and lowering the lever arm 310 until a lobe on the drive rotor 32 contacts a lobe on the idler rotor 36 at each extreme of rotation—a few thousandths of an inch (hundredths of a millimeter) of motion at the rotors 32, 36. The length selected for the lever arm 310, along with the incorporation of a runout gauge or other comparable tool as a deflection gauge 314, magnifies the actual deflection at the pitch diameter and permits precise, high-resolution measurement of the fit between the rotors 32, 36.

In some embodiments, the gauge 314 can include a metering shaft 348 configured to be free to move in an axial direction, oriented to maintain contact with a reference surface 350 on the lever arm 310, substantially tangent to the arc of motion of the reference surface 350. In other embodiments, optical or acoustic distance measuring devices or the like may be preferred in place of the runout gauge 314 shown in FIGS. 13-15. In still other embodiments, direct rotation measurement devices such as encoders, angle change detectors, or tilt sensors may be affixed to the drive rotor shaft 344 in place of or on the lever arm 310, with the limitation that the resolution achieved by the measuring device must be sufficient to ensure repeatability. The balance of the discussion herein assumes that an arm 310 and gauge 314 are used. Embodiments lacking provisions for locking the rotor shaft 344 at a selected angle may provide equivalent functionality.

The arm 310 may be centered and locked in its travel halfway between the readings of the deflection gauge 314 by setting the first and second torque arm deflection screws 316, 318 against the contact tab 320. The drive gear 38 may then be locked onto the drive rotor 32 by tightening the drive gear locking screw 352 (shown in FIG. 2), drawing the respective tapers into contact.

The above sequence places the rotors 32, 36 into a uniform and repeatable first condition of alignment, which can be shown to benefit significantly from further refinement. It may be observed that, because the blower operates under load from a single direction, i.e., pressure at the outlet port exceeds that at the inlet port, one face of the teeth on the drive gear 38 applies force continuously to one face of corresponding teeth on the idler gear 40, with the gap between the respective non-contact faces constituting lash. Further, it may be observed that tightening a fully-meshed helical gear onto a taper inserts positional shift. Consequently, centering the deflection gauge 314 as described above results in an off-center relationship of the rotors 32, 36 in operation. It may be further observed that this realizes consistently one possible alignment setting in the range of the prior art.

As a further refinement in method that uses the same apparatus, the value to which the torque arm 310 is locked may include a predetermined reference compensation value. For example, where the difference in deflection gauge 314 readings is 0.050 inches (the gauge may be settable to zero at one extreme of travel in some embodiments, allowing this value to be read directly), so that the median position is 0.025 inches, a reference compensation value such as 0.015 inches may be added—that is, the torque arm deflection screws 316, 318 may be adjusted for a gauge reading of 0.040 inches rather than 0.025 inches—prior to tightening the drive gear 38. It may be observed that digital runout gauges capable of resolution at least one order of magnitude finer than that indicated herein may be able to provide sufficient precision to assure repeatability. Devices with two or three more significant digits are likewise available, and may be preferred in some embodiments.

As yet another refinement in method, likewise using the same apparatus, any gear lash between the drive and idler gears 38, 40 may be set to zero by preloading the gears 38, 40 in the proper rotation direction. For convenience in setup of such a preload, the drive clamp gear 332 may be carried on an eccentric shaft 354 with a loading spring 356, which may further include a stop pin 358, and which permits the drive clamp gear 332 to engage the unsecured drive gear 38 with a predetermined load before the drive locking lever 360 is engaged.

The above-described assembly sequence produces a blower assembly capable of installation into a product, but does not verify that the steps have yielded acceptable rotor alignment. A test and verification procedure performed following the above sequence may ensure that low noise has been adjusted in.

Figure 14:
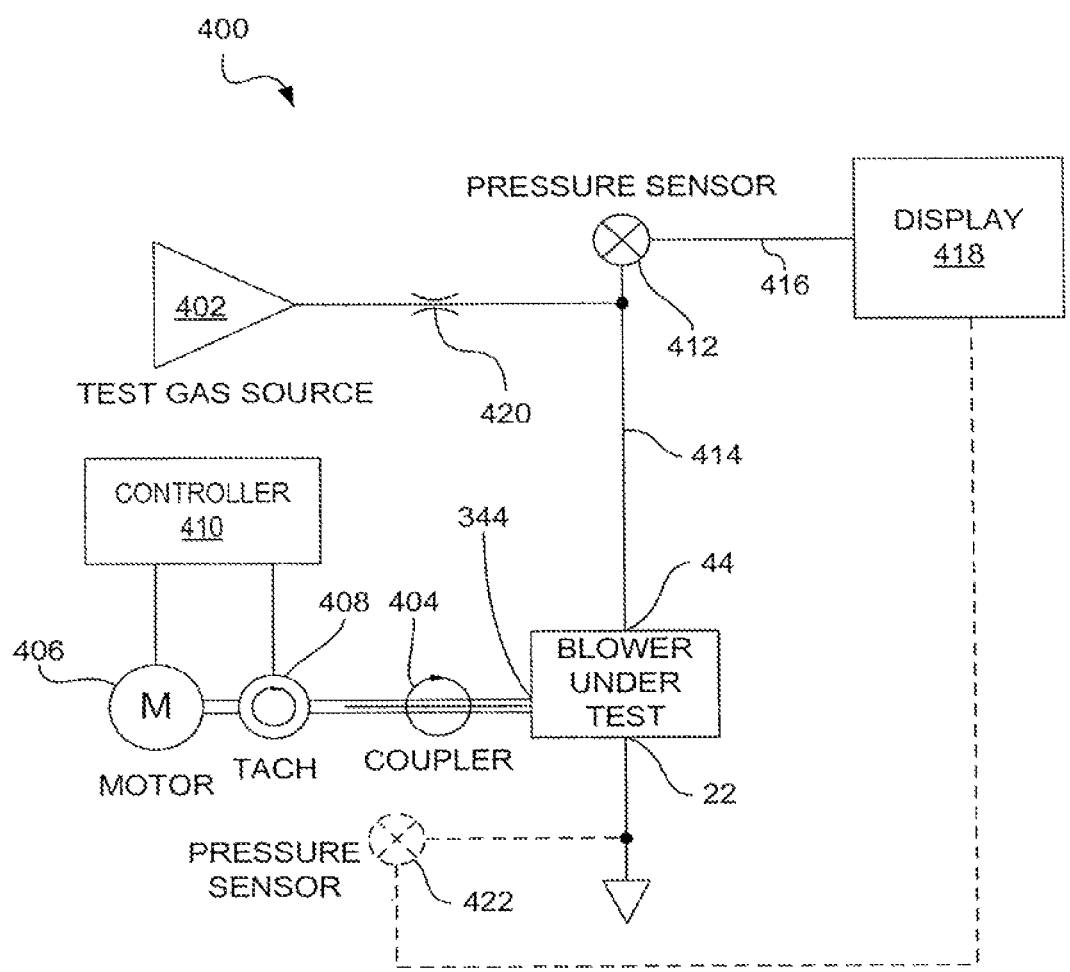
FIG. 14 is a block diagram of a pressure test fixture incorporating the present invention.

FIG. 14 shows in block diagram form tooling 400 for subsequent measurement of leakback variation, made, for example, by applying a selected value of constant reverse flow of a test gas 402 from the outlet port 44 to the inlet port 22 while rotating the drive rotor shaft 344 at a selected forward rate, such as with a coupler 404—connected motor 406, tachometer 408, and controller 410—constant flow in the presence of leakback variation exhibits varying pressure as measured by a pressure transducer 412 in the gas stream 414. The test may not require regulating test gas flow rate if pressure transient data 416 as measured in the gas stream 414 and displayed 418 is adequately predictive of noise in normal operation. Provision of flow restriction 420 and installation of a pressure transducer 422 in the blower inlet path 44 (dashed path) may likewise allow differential (inlet-to-outlet) pressure exhibiting leakback variation to be established by rotating the drive shaft 344 at a selected shaft speed without application of a test gas 402.

This measurement may show a resulting pattern of leakback variation corresponding to low acoustical noise and physically associated with uniform lobe spacing under load. Such a low noise setting is further characterized by substantially uniform pressure transients from all six interlobe spacings 288 during a shaft rotation, as shown in the plot of a shaft rotation of FIG. 8. In contrast, acoustically noisy adjustment states typically exhibit three distinct transients 286 per rotation, physically associated with close lobe spacing and low leakback flow alternating with loose lobe spacing and high leakback flow during a shaft rotation, as shown in FIGS. 9 and 10 and discussed above. It is implicit in this statement that the rotors do not strike one another at any point during operation.

Excessive leakback variation and/or three-pulse fluctuation in a unit under test may be treated as an alignment defect. Correction entails releasing the drive gear 38, reassembling the alignment tooling configuration as described, applying an offset greater or less than the 0.015 inches indicated above, and retightening the drive gear 38. This is followed by a repeat of the leakback variation measurement.

A specific value of offset may be determined to be characteristic of blowers in a particular product style or production lot. Such initial value determination may allow alignment and verification to be made routine for blowers of a style or lot.

Assignment of specific step sizes in modifying offset values to compensate for sample variation may likewise be determined to be useful. Thus, if the 0.015 inch offset of the above example were to prove unsatisfactory for some units, a procedure can specify that step sizes of 0.005 inches, for example, are to be used in successive aligning sequences applied to such units. Selection of offset value and step size are user options.

Specific ranges of deviation readings or characteristic features of pressure waveforms may be determined to be associated with particular magnitudes or directions of misalignment. Using such detailed information, step size and direction may be selected in view of test results, rather than invariantly increasing by one step and retesting to get a second data point, then using the two values to estimate the setting for a third test. For example, the drive rotor 32 angle can be known in real time, such as by using as the tach 408 an angle encoder or like transducer that provides at least a zero pulse for each shaft revolution, and by providing in the coupler 404 positive orientation of the drive rotor lobes with reference to the encoder-style tach 408. This can permit distinguishing between states where a drive rotor lobe is engaged and states where an idler rotor lobe is engaged (considering the motor-end point of one rotor lobe meshed at the corresponding point of the other rotor's interlobe trough to be "engaged" for this purpose, which corresponds to minimum leakback). Then, if the pressure is high when a drive lobe is so engaged, and low when an idler lobe is so engaged, it may be deduced that the drive rotor is retarded from its proper position, so that the necessary offset correction is positive, i.e., that which tends to advance the drive rotor with reference to the idler rotor. The converse also applies.

Figure 15:
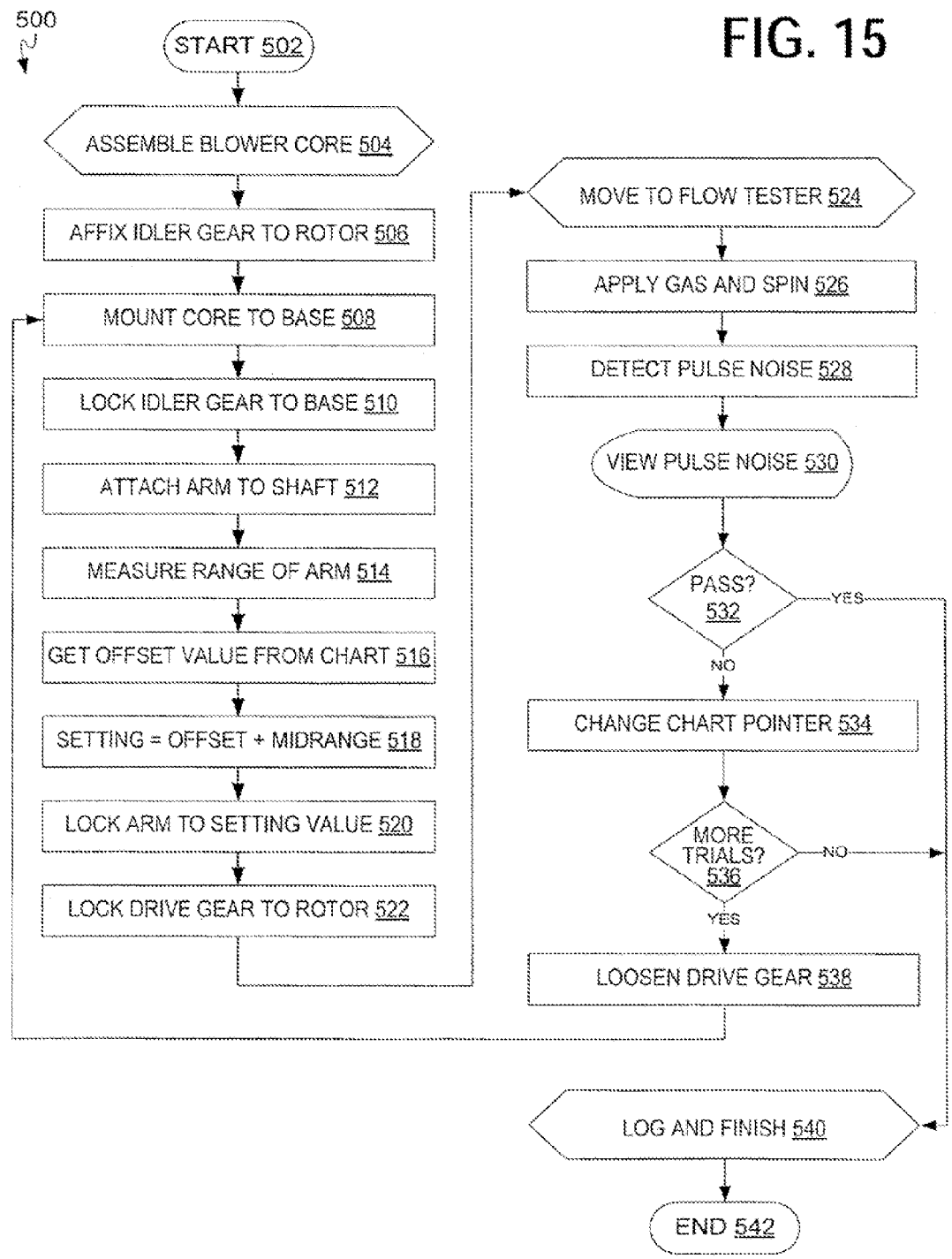
FIG. 15 is a flowchart summarizing an alignment method incorporating the present invention.

FIG. 15 presents the above procedure in flowchart 500 form, to wit:

From a start 502 state, install a paired drive rotor and idler rotor in a blower housing, to include gauging of individual parts, installing and preloading bearings, and other requisite steps, summarized as assembling a blower core 504. Following this, affix an idler gear to a gear-side idler rotor shaft 506 and mount the blower core and idler gear to an alignment fixture base 508. Next, immobilize the idler gear with reference to the housing using a provision for locking the gear to the base 510.

To this group, attach a lever arm to the motor-side (drive rotor) shaft 512 and measure and record the range (i.e., permissible displacement) of the arm 514 by rotating the lever arm in alternate directions to displace the lever arm to a first and a second extent of travel, wherein each extent of travel is determined by contact of the drive rotor against the idler rotor within the housing, and wherein the arm 514 motion is detected by a transducer such as a runout gauge. Next, form a first position value by adding a first reference compensation value to a displacement value midway between the measured displacement extents; this may require getting an offset value from a chart 516 and calculating 518 a setting equal to the midrange position plus the chart-based offset. After this, immobilize (lock) the lever arm at the first position (setting) value 520 and affix 522 a drive gear to the rotor to which the lever arm is attached, using the gear-side drive rotor shaft. This completes the assembly part of the calibration. At this point, a blower may be ready for addition of the remaining components, such as air fittings and an electric motor, and would likely perform better than blowers assembled according to prior processes. However, further assurance of minimized noise production may be realized by validation testing.

Continuing FIG. 15 processes, the blower may be removed 524 from an alignment fixture as described above to a flow tester if separate devices are employed for these purposes. In some embodiments, the flow tester may include a gas source with flow into the output port of the blower that can be established at a rate, may include a provision for spinning (rotating) the drive shaft in a forward-flow direction 526, such as at a predetermined rotation rate, and may provide for detection of pulse noise 528, such as by measuring flow pressure at a point in the flow path. The measurement may employ a pressure-to-voltage or pressure-to-digital-data transducer, direct display of pressures using mechanical minimum-reading and maximum-reading gauges, and the like, for detection; values detected represent noise that may be quantified, stored, or displayed for viewing 530. A blower may pass or fail criterion-based comparison tests 532 for transient pulse magnitude or rate; where a blower achieves a passing rating, this result may be logged 540 and the testing ended 542.

Where a test criterion is not passed 532, the process can be repeated, first selecting 534 another chart-based value (such a chart may be a physical list, a computer-based data string, or another form; a "pointer" may thus be a pencil mark, an address offset, or another method). If there is an indication such as a special value in the chart that no more trials are to be conducted 536, then the previous log entry 540 and test ending 542 may be invoked with a rejection logged. Barring such rejection, the drive gear may be loosened 538 and the process repeated, beginning with reattaching the unit under test to the mechanical alignment fixture 508. This summarizes basic procedures for aligning rotors according to the inventive method, including repeated adjustments that may be required to compensate for production variations.

The above procedure does not expressly address units whereof cumulative tolerances or defects not readily detected prevent achieving a passing rating, referring instead to logging of failures. Some failed units may potentially be recoverable by parts substitution or teardown and reassembly, if of sufficient value, or may be salvaged or discarded, if not.

The above procedure, having principal attributes of repeatable alignment steps, direct physical measurement of critical dimensions, high-resolution adjustment, and an alignment verification test directly associated with proper operation, allows component tolerance buildup in production units to be compensated during final alignment, so that production blowers can exhibit consistent behavior and a desirable extent of noise reduction. This repeatability is distinctly different from prior art methods, which lack at least fine control over adjustment settings. A leakback variation test, if performed in the context of a prior-art assembly procedure (i.e., one lacking fine control over adjustment), cannot alone serve as the basis for a predictable manufacturing process for low-noise blowers.

The dimensions indicated above pertain to rotors that are individually comparable in size to miniature photographic film canisters, and that are used near ordinary room temperature, with temperature rise due to work typically limited by the continuous introduction of room air. For significant differences in size or ranges of thermal exposure, specific tolerance values may be appreciably different, although the underlying method is applicable. Verification testing may be performed at selected differential pressures, or over particular temperature ranges where the presumed atmospheric-pressure and room-temperature procedure above may be insufficiently refined. For example, in combustion engine applications, supercharger rotors may each be on the order of size of a bread loaf, and temperatures for which operation requires validation may range from well below freezing up to several hundred degrees. In contrast, for cryogenic applications, test temperatures may require supercooling of both enclosures and test fluids. Similarly, for micro- or nanosized applications, both angle transducers and pressure transducers may require still finer resolution than that indicated herein to assure repeatability.

The method and apparatus described herein may be applied to blowers over a range of size, application, and materials, as well as varying numbers of lobes. While the embodiment presented to illustrate the invention uses three-lobe, helical, cycloidal rotors with sixty degree advance, a range of Roots-type blower styles may apply the indicated method. Similarly, the methods indicated may be applicable to devices other than Roots-type blowers, where fine mechanical adjustment is required, fine control of mechanical positioning is practical, and measurement processes sufficient to reveal workable pass/fail criteria are available.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A method comprising the steps of:
immobilizing an idler gear with reference to a housing of a Roots-type blower, the housing comprising a drive rotor fixedly disposed on a drive shaft therein, an idler rotor engaged with the drive rotor and fixedly disposed on an idler shaft therein, a drive gear rotatably disposed on the drive shaft, and the idler gear engaged with the drive gear and fixedly disposed on the idler shaft;
rotationally displacing the drive shaft in opposite directions to a first extent and a second extent of travel, wherein each extent of the travel is defined by direct contact of the drive rotor against the idler rotor;
positioning the drive shaft at a determined rotational angle between the first and second extents of travel; and
fixing the drive gear to the drive shaft while the drive shaft is positioned at the determined rotational angle.

2. The method of claim 1, further comprising the steps of:
coupling a source of a test gas to an outlet port of the blower thereby establishing a first flow path from the source to the outlet port;
rotating the drive shaft in a forward-flow direction at a predetermined rate while allowing the test gas to flow into the outlet port;
measuring a pressure at a location in the first flow path at a plurality of rotational angles of the drive shaft;
identifying at least one characteristic of a curve of the measured pressure vs. the respective rotational angle;
comparing the at least one characteristic to at least one criterion; and
assigning a passing rating to a blower that satisfies the at least one criterion.

3. The method of claim 2, further comprising the steps of:
releasing the drive gear of a blower that does not satisfy the at least one criterion;
positioning the drive shaft at a new determined rotational angle that is offset by an alternate reference compensation amount from an angle that is midway between the first and second extents of travel;
fixing the drive gear to the drive shaft while the drive shaft is positioned at the new determined rotational angle;
immobilizing the idler gear with reference to the housing; and
repeating the steps of claim 2.

4. The method of claim 3, wherein the steps of claim 3 are repeated in a series of trials with an incrementally changed alternate reference compensation amount for each trial until either the blower is assigned a passing rating or an indication is reached that no more trials are to be conducted and the blower is rejected.

5. The method of claim 2, wherein the step of measuring a pressure comprises measuring the pressure at a sample rate, in samples per second, that is greater than or equal to a value that is twice a product of a rotation rate, in rotations per second, of the drive shaft and a combined number of lobes on the drive and idler rotors.

6. The method of claim 1, wherein the determined rotational angle is midway between the first and second extents of travel.

7. The method of claim 1, wherein the determined rotational angle is offset by a predetermined reference compensation amount from an angle that is midway between the first and second extents of travel.

8. The method of claim 1, further comprising the step of:
preloading the engagement of the drive gear with the idler gear.

* * * * *